: 3,023,224
Patented Feb. 27, 1962

3,023,224
DEHYDROHALOGENATION OF POLY-HALOGENHYDRIN ETHERS
Ferdinand Meyer, Mannheim, and Kurt Demmler, Ludwigshaven (Rhine), Germany, assignors to Badische Anilin- & Soda-Fabrik Aktiengesellschaft, Ludwigshafen (Rhine), Germany
No Drawing. Filed Apr. 23, 1956, Ser. No. 579,760
1 Claim. (Cl. 260—348.6)

This invention relates to an improved process for the production of epoxy ethers from polyhalogenhydrin ethers of saturated aliphatic polyhydric alcohols.

Epoxy ethers have heretofore been obtained by treating monohalogenhydrin ethers of monohydric or polyhydric alcohols with aqueous solutions of compounds having a strong basic action, as for example caustic alkali or alkaline earth solutions, at reduced or normal temperature, and extracting the reaction mixture with selective solvents, such as ether, hydrocarbons or carbon tetrachloride.

This method cannot be used however in the case of halogenhydrin ethers of polyhydric alcohols which contain more than one halogenhydrin ether group because in this case the quality of the end product is considerably reduced by reason of hydrolysis and/or polymerization of the epoxy compounds. For the dehydrohalogenation of such halogenhydrin ethers there have therefore been developed processes in which the splitting off of hydrogen halide is carried out with solid caustic soda in acetone or with alkali salts of amphoteric oxides, as for example solid alkali aluminate, silicate or zincate, dioxane or organic solvents which take up at least small amounts of water being used as diluents. This method of working is also unsatisfactory because relatively large amounts of solvent are required to carry it out and the separation of the solid inorganic salts makes necessary a further working operation; moreover the quality of the compounds prepared is not entirely satisfactory.

The object of this invention is to provide a process for the production of polyepoxy ethers of polyhydric alcohols in which the above-mentioned disadvantages are avoided and the poly-epoxy ethers are obtained in a good yield with a high epoxy value.

A further object is a process according to which the hydrin compounds of polyhydric aliphatic alcohols with a plurality of halogenhydrin ether groups are converted into the corresponding epoxy ethers and the latter may be separated from the reaction mixture in the simplest manner.

Another object of the invention resides in the use of a hitherto unemployed aqueous solution of an agent binding hydrogen halide for the dehydrohalogenation of halogenhydrin ethers of polyhydric saturated aliphatic alcohols containing a plurality halogenhydrin ether groups and a new solvent for this reaction which dissolves both both the halogenhydrin ether and also the epoxy ether formed, but is itself immiscible with water or only partly miscible therewith.

We have now found that the said objects are achieved and polyepoxy ethers of polyhydric saturated aliphatic alcohols are obtained in good yields by carrying out the dehydrohalogenation of polyhalogenhydrin ethers especially polychlorhydrin ethers of aliphatic saturated polyhydric alcohols with aqueous concentrated solutions of inorganic bases in the presence of an aliphatic monohydric alcohol which is only moderately soluble or insoluble in water but which dissolves the resultant epoxy ether and the halogenhydrin ether used as initial material, at temperatures of −20° C. to +30° C. advantageously at −5° C. to +20° C., in particular at −5° C. to +10° C.

As initial materials there are suitable polyhalogenhydrin ethers of polyhydric aliphatic saturated alcohols, such as glycerine, butane-triol, pentaerythritol, trimethylol propane, trimethylol ethers, hexamethylol ethers of melamine, sorbitol, dipentaerythritol and hexanetriol. The polyhalogenhydrin ethers for example polybromhydrin- or polychlorhydrin ethers of these polyhydric alcohols are known and may be prepared in the usual way, as for example by etherification by the action of corresponding amounts of epoxychlorhydrin or dichlorhydrin or the corresponding brom-compounds on all or only part of the hydroxyl groups of the polyhydric alcohol in the presence of a catalyst, as for example boron trifluoride. Suitable polyhalogenhydrin ethers are especially those which contain more than 2, as for example 2.1 to 3, halogenhydrin ether groups.

Monohydric alcohols which are suitable as solvents and dissolve both the initial polyhalogenhydrin ether and the epoxy compound formed are chiefly the saturated primary, secondary or tertiary aliphatic alcohols, in particular those of a medium number of carbon atoms, especially with 4 to 8 carbon atoms.

Suitable alcohols are for example normal butanol, normal amyl alcohol, secondary n-amyl alcohol, tertiary amyl alcohol and ethylhexanol. The alcohols should only take up small amounts of water, preferably 2 to 10% of weight, at the working temperatures. They may therefore be separated well from the aqueous mother liquor. The alcohols may also be used in admixture with each other or with an addition of other water-insoluble organic solvents, as for example aromatic hydrocarbons, such as benzene or toluene. These water-insoluble organic solvents should be indifferent, i.e. they should not react under the reaction conditions either with the initial materials or with the end products.

The dehydrohalogenation of the polyhalogenhydrin ethers according to this invention is preferably effected by introducing an amount of an aqueous concentrated solution of a strong inorganic base which is at least equivalent to that required for binding the amount of hydrogen halide split off, preferably a somewhat larger amount, as for example up to 20% excess, to a solution of the halogenhydrin ether in the monohydric alcohol serving as solvent at temperatures of −20° to +30° C., care being taken for a good and thorough mixing until the end of the reaction. The amount of alcoholic solvent is preferably chosen so high that a good and thorough mixing of the solution with the aqueous alkali solution is ensured. This can readily be ascertained by a small preliminary test. In general solvent additions of 33 to 66%, with reference to the amount of halogenhydrin ether used, are used.

As inorganic bases, which are used in aqueous solution in concentrations of, for example, 25 to 60%, preferably 35 to 55% there may be mentioned in particular sodium hydroxide and potassium hydroxide. Surprisingly no hydrolysis or polymerization of the epoxy compounds, once they have been formed, takes place. After separation of the aqueous phase, the epoxy ethers are obtained by distilling off the alcohol, if desired after washing with water or saturated salt solution, as for example sodium chloride solution.

The following examples will further illustrate this invention but the invention is not restricted to these examples. The parts specified are parts by weight.

*Example 1*

370 parts of the chlorhydrin ether of glycerine, which has been obtained from glycerine and epichlorhydron in the mol ratio of 1:3 with boron trifluoride as catalyst, are dissolved in 150 parts of butanol, cooled to −5° C. and while stirring vigorously 262 parts of a 45% caustic soda solution are slowly added so that the temperature does not exceed 0° C. When all the caustic soda solution has been run in, the whole is stirred for about 3 hours further at 0° C. to —5° C. and then, for more rapid phase separation, 50 parts of toluene and 200 parts of water are added. The phases are separated and the aqueous layer is repeatedly extracted with 100 parts of a mixture of butanol and toluene in equal proportions. From the non-aqueous phase combined with the extracts, the solvent is distilled off in vacuo, finally in a boiling waterbath, and as a residue 260 parts are obtained which after filtration is an almost colorless, clear, thin liquid. The filtrate has an epoxy value of 0.73. The substance still contains 10.5% of chlorine and has a mean molecular weight of 283 (ebullioscopically from dioxane) which corresponds to a content of somewhat more than 2 epoxy groups per molecule.

*Example 2*

384 parts of the chlorhydrin ether of 1.2.4-butane-triol which has been obtained from 1 mol of butane-triol and 3 mols of epichlorhydrin with boron trifluoride as catalyst, are dissolved in 200 parts of a mixture of equal parts of butanol and toluene and while stirring vigorously at —5° C., 310 parts of a 38% caustic soda solution are slowly added so that the temperature remains between about —2° C. and —6° C. When all the caustic soda solution has been run in, the whole is stirred for a further 3 hours at 0° C. to —5° C., then 150 parts of water are added, the aqueous layer separated and the solvent distilled off in vacuo from the non-aqueous layer. There remain behind 294 parts of a pale yellow colored liquid. It has an epoxy value of 0.67 and a chlorine content of 10.25%. The product obtained has a mean molecular weight of 350 corresponding to a content of 2.14 epoxy groups per molecule.

*Example 3*

990 parts of a chlorhydrin ether which has been prepared in known manner from 46 parts of glycerine, 829 parts of pentaerythritol and 2,128 parts of epichlorhydrin are dissolved in 600 parts of amyl alcohol and then at 10° C. to 15° C. 700 parts of a 45% caustic soda solution are added during the course of an hour. When all the caustic soda solution has been run in, the whole is stirred for another 2 hours. Then 425 parts of water are added and the aqueous mother liquor separated from the organic liquids. The solvent is then removed in vacuo. There remain 670 parts of a pale yellow colored liquid of low viscosity which has an epoxy value of 0.63 and a chlorine content of 10.6%.

What we claim is:

In a method of producing polyepoxy ethers from polyhalogenhydrin ethers of saturated aliphatic polyhydric alcohols selected from the group consisting of glycerine, butane-triol, and pentaerythritol by dehydrohalogenation of said polyhalogenhydrin ethers with a concentrated aqueous solution of an alkali metal hydroxide at a temperature of about —20° C. to about +30° C., the improvement which comprises carrying out said dehydrohalogenation in the presence of a monohydric alcohol selected from the group consisting of n-butanol and alkanols having from 5 to 8 carbon atoms in the molecule in an amount of about 33 to 66% by weight with reference to the amount of the halogenhydrin ether.

References Cited in the file of this patent

UNITED STATES PATENTS

| | | |
|---|---|---|
| 2,061,377 | Groll | Nov. 17, 1936 |
| 2,164,007 | Evans | June 27, 1939 |
| 2,224,849 | Groll | Dec. 17, 1940 |
| 2,248,635 | Marple et al. | July 8, 1941 |
| 2,314,039 | Evans | Mar. 16, 1943 |
| 2,434,414 | Kharasch | Jan. 13, 1948 |
| 2,581,464 | Zech | Jan. 8, 1952 |
| 2,680,109 | Stevens | June 1, 1954 |

FOREIGN PATENTS

| | | |
|---|---|---|
| 513,388 | Canada | May 31, 1955 |

OTHER REFERENCES

Fieser: "Org. Chemistry" (1944), page 117.
Cohen et al.: J.A.C.S., 75:1733 (1953).